Feb. 5, 1963   E. HENRY-BIABAUD   3,076,629
SEAT-ADJUSTING DEVICE, NOTABLY FOR AUTOMOTIVE VEHICLES
Filed Oct. 18, 1960   3 Sheets-Sheet 3
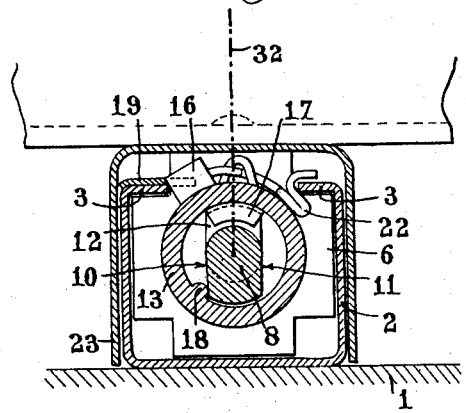
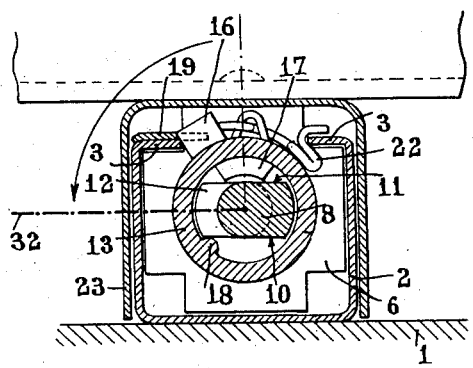
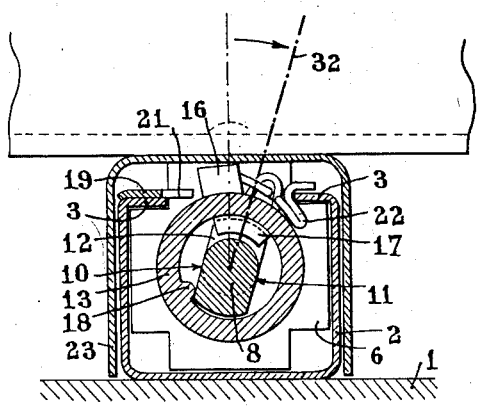

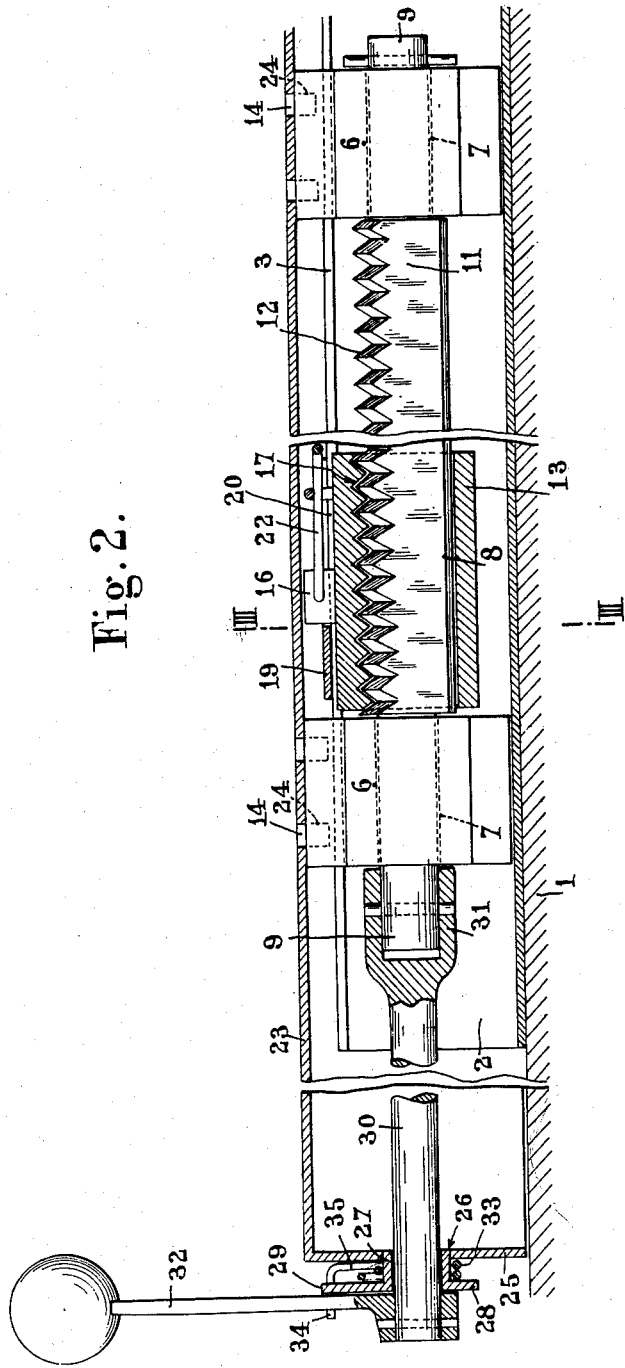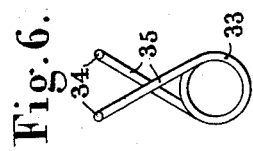

United States Patent Office 3,076,629
Patented Feb. 5, 1963

3,076,629
SEAT-ADJUSTING DEVICE, NOTABLY FOR AUTOMOTIVE VEHICLES
Edmond Henry-Biabaud, Paris, France, assignor to Société Anonyme André Citroen, Paris, France
Filed Oct. 18, 1960, Ser. No. 63,388
Claims priority, application France Oct. 20, 1959
7 Claims. (Cl. 248—424)

Automobiles are generally provided with a device for adjusting the longitudinal position of the seats for leg room and comfort of the driver and passengers of the vehicle.

In some vehicles, notably those comprising two rows of seats and only two doors, especially commercial vehicles such as delivery vans and the like, it is frequently necessary to provide means for sliding the front seats completely backwards and then forwards to their initial adjustment position, in order to facilitate the access to these seats.

This twofold function may be obtained by superposing two carriages or like devices adapted, the one to adjust the seat, and the other to move the complete assembly as a unit.

It is the primary object of the present invention to provide a device combining the two functions broadly set forth in the preceding paragraphs.

To this end, this device comprises first means for adjusting the position of the seats in the longitudinal direction, and second means for locking said seats in their initial adjustment position after they have been moved backwards in order simply to facilitate the access to the seats of the vehicle.

According to a preferred form of embodiment of this invention said first means consist of the combination of a rail-forming channel member having its flange ends bent inwards; of a pair of slides on which the seat is mounted, which are slidably mounted in turn in said channel member; of a rod mounted for rotation but held against axial sliding movement in each slide, said rod being formed on its top surface with a longitudinal rack; of a socket slidably mounted on said rod, adapted to pivot against the resistance of a suitable return spring and formed on its inner upper face with inner teeth adapted on the one hand to mesh with said rack for longitudinally locking said seats, and on the other hand to be disengaged from said rack to permit the seat adjustment by rotating said rod in said socket; of a casing having the shape of an elongated box of inverted-U cross-sectional configuration, which is rigid with said pair of slides and said rod; and of a crank handle or like control lever rigidly mounted on one end of said rod for causing the latter to pivot in said socket.

The second means of this invention consist of the combination of a metal part secured at a properly selected location on the upper face of said rail-forming channel member, the front portion of said metal part constituting a cross member adapted to act as a stop for the front slide when the seat has completed its backwards stroke, whilst the rear portion of this metal part is formed with a lateral cam face extending horizontally as well as with a transverse notch formed at the root or front end of said cam face; of a projection rigid with said socket, adapted to co-act with said cam face and said notch; of a spring constantly urging said projection for engagement with said cam face and said notch; and of a longitudinal rib projecting from the inner cylindrical surface of said socket along a suitable generatrix thereof.

The angular position of this rib is selected with a view to provide two functions, i.e.:

Limiting the rotation of said rod within the socket to one quarter of a revolution in one direction, that is, to the extent sufficient for releasing the socket teeth from the rack teeth and permit the sliding movements of the rod in the socket as already set forth hereinabove for seat adjusting purposes; in this case the socket is held against movement, as its projection engages said notch;

Locking the rod and socket for rotation in unison in the opposite direction; in this case the rod bears on the rib to free the projection from the notch, the rod and socket being also rigid with each other for longitudinal movement to permit the backward movement of the seat and enable same to resume its initial adjustment position, since the rack teeth remain in engagement with the socket teeth.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings in which:

FIGURE 2 is a longitudinal section of the device.

FIGURES 3, 4 and 5 are cross-sectional views taken upon the line III—III of FIG. 2, showing the device, respectively in the seat-locking position, in the seat-adjusting position and in the seat unlocking position; and FIGURE 6 is a front view of the control lever return spring.

Figure 1:
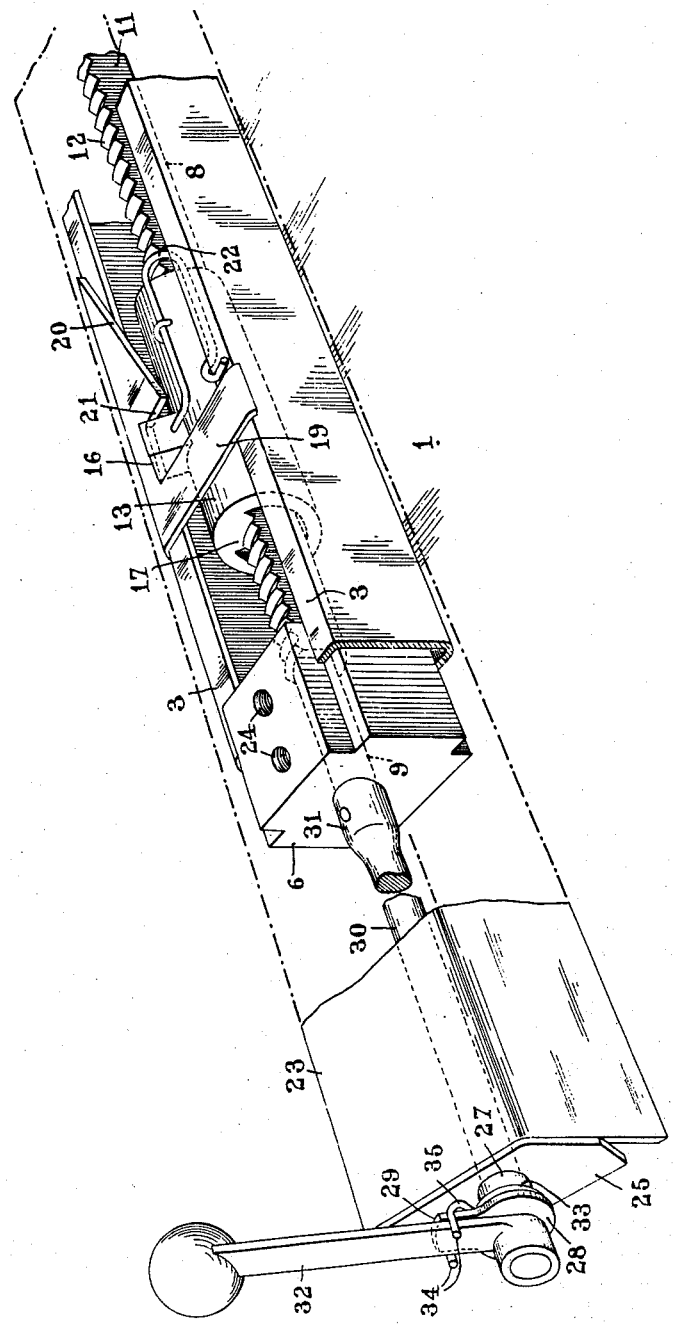
FIGURE 1 is a perspective view with parts broken away, showing the adjustment device of this invention with its control lever.

Secured on the floor 1 of the automobile vehicle, for each seat, is a longitudinal rail-forming channel member 2 of which the flanges 3 have their upper edges bent inwardly. This rail 2 is formed with means for securing it on the floor of the vehicle. A pair of slides 6 having a cross-shaped section, adapted to slide within said rail 2, each are formed with an axial bore 7 in which an adjustment cylindrical rod is rotatably mounted but held against axial movement; this rod comprises a central portion 8 of greater diameter than the end portions 9 which is formed on the one hand with a pair of flat parallel side faces 10, 11 parallel with the rod axis, and on the other hand with a rack 12 on its upper face.

The relative spacing of the flat parallel side faces 10, 11 is such that the rack 12 extends over about one-fourth of the circumference of cylinder 8.

The slides 6 bear against the shoulder-forming end faces of the central portion 8 of the adjustment rod and are held against axial movement on this rod by pins extending diametrally through the rod at the proper locations.

The aforesaid central portion 8 of the adjustment rod co-acts with a locking socket 13 having externally the form of a hollow cylinder formed with a radial projection 16, the bore of this socket being formed with teeth 17 corresponding to those of the rack 12 of the adjustment rod, these teeth 17 extending over about one-fourth of the circumference of this bore. Moreover, the cylinder bore is formed along a suitable generatrix with a rib 18 for limiting to about one-fourth of a revolution or 90° (see FIGS. 3 to 5) the counter-clockwise rotation of the adjustment rod in the socket 13.

A metal part is secured at a properly selected location on the upper face of the guide rail 2, the front portion of this part constituting a kind of cross member 19 while its rear portion is formed with a lateral cam face 20 extending horizontally and with a transverse notch 21 formed at the root or front end of said cam face.

A suitably shaped spring 22 constantly urges the projection 16 for engagement with the cam face 20 and notch 21 during the axial movements of the socket in the rail 2.

A casing 23 in the form of an inverted channel is axially rigid with the pair of slides 6 and with the rod 8; to this end, the casing 23 is formed with plain holes 14 through which fixation screws may be inserted for engagement in tapped holes 24 of said slides.

The plain and tapped holes 14 and 24 are preferably also used for securing the seats proper on the slides.

The front face 25 of this casing is formed with an axial hole 26 having secured therein a cylindrical sleeve 27 carrying a flange 28 provided with a radial lug 29.

Extending through this sleeve 27 is a control rod 30 of which one end constitutes a socket 31 adapted to be coupled to the adjustment rod 9, the other or front end of the rod 30 carrying a control crank handle or lever 32. The socket 31 is secured by a diametral pin on the adjustment rod and its relevant end face bears against the front face of the front slide 6 to prevent any axial displacement thereof in relation to the adjustment rod. Registering holes are formed through the control rod and the hub of the crank handle or lever for the passage of a coupling or fastening pin.

A nipper spring 33 (FIG. 6) is rigidly fitted around the socket 27 and the bent horizontal ends 34 of its sides 35 extend on either side of the radial lug 29 of flange 28.

As the crank handle 32 is initially placed with its radial arm extending between the two sides of spring 33, it will be seen that the latter tends to urge the crank handle to this position irrespective of the direction in which it is moved.

The relative position of crank handle 32 and adjustment rod 8 is such that the rack 12 formed on this rod faces upwards and is in meshing engagement with the inner teeth 17 of socket 13 when the crank handle is in its inoperative position in which it is constantly urged by the spring 33 (FIG. 3).

Now reference will again be made to FIG. 1 to describe the operation of the adjustment device, a distinction being made however between the seat adjustment for the convenience of the user or users and the backward movement required for facilitating the access to the seats.

To adjust the seat as required for the passenger's leg room and comfort, the projection 16 of the locking socket 13 engaging the notch 21 of transverse member 19, the operator disengages the socket from the adjustment rod 8 by rotating the latter through one-fourth of a revolution in the counter-clockwise direction; thus, the teeth of rack 12 are disengaged from the inner teeth 17 of socket 13, so that the adjustment rod 8 may be moved freely in the axial direction inside the socket; then the operator may cause the seat to slide without difficulty to the desired position, since the slides on which it is mounted can move freely in the axial direction in the guide rail 2. When the seat has been properly positioned the operator simply releases the hand lever or handle 32 and the device is automatically locked in position; in fact, the spring 33 restores the crank handle 32 to its vertical inoperative position so as to rotate the adjustment rod in the opposite direction, the rack teeth resuming their meshing engagement with the socket teeth.

To retract the seat backwards with a view to facilitate the access to the interior of the vehicle, the crank handle or like control lever is rotated through one-quarter of a revolution in the clockwise direction; thus, the lower edge of the flat lateral face 10 of the adjustment rod 8 engages the rib 18 in socket 13 and rotates same against the resilient action exerted by the spring 22 until the projection 16 on the socket is disengaged from the notch 21; in FIG. 5 it will be seen that after the adjustment rod and the socket have been pivoted as a unit the rack and socket teeth are still in meshing engagement; then, the seat can be pushed backwards until the front slide 6 engages the cross member 19.

To restore the seat to its initial adjustment position the operator simply pushes the seat forwards until the projection 16 of socket 13 snaps back into the notch 21, thus locking the assembly in its initial position.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A device for adjusting the seat notably of an automotive vehicle, comprising in combination with said seat, first means for adjusting the position of said seat a longitudinal direction, second means for locking said seat in the selected adjusted position, and means co-acting with said first and second means for unlocking said seat with a view to momentarily move same in a longitudinal direction from said selected position in order to facilitate the access to the seat and automatically relocking it in the preceding adjustment position during the return movement of the seat to the previously selected position, wherein said position adjusting means consist of the combination of a rail-forming channel member having its flange ends bent inwards, of a pair of slides on which the seat is secured, said slides being adapted to slide within said rail-forming channel member; of an adjustable rod mounted for rotation but held against axial movement in an axial bore of each slide and formed with a longitudinal rack; of a locking socket formed with inner teeth adapted to mesh with said rack for locking the former and to be disengaged from said rack by rotating said rod in said socket for seat-adjustment purposes; of a casing having an inverted-U cross-section, and said casing being axially rigid with said pair of slides and said rod; and of a crank handle rigid with the end of said rod for controlling the rotation of said rod in said socket.

2. A device as set forth in claim 1, wherein said means for locking the seat of an automotive vehicle in the selected adjustment position consist of a radial projection disposed on the outer face of said locking socket, and a metal part rigid with said rail-forming channel member which is formed with a notch in which said projection may be engaged for locking purposes.

3. A device as set forth in claim 2, wherein said means co-acting with the means for locking the seat in the selected adjustment position consist of a spring urging said locking socket for rotation in the direction to cause its radial projection to engage said notch in the metal part rigid with said rail-forming channel member, of means adapted to interlock said adjustable rod with said socket for rotation in the opposite direction, and of a lateral cam face formed on said notched metal part and engaged by said socket projection under the influence of said spring so as to guide said projection and cause same to snap back into said notch at the end of the return movement of the seat to its normal position of use, after the seat has been moved backwards to facilitate the access to the seat.

4. A device as set forth in claim 3, wherein said means for rotatably interlocking said adjustable rod and said socket in one direction of rotation consist of an inner longitudinal rib formed in said socket and of one outer longitudinal edge of said rod, said rib and edge normally engaging each other so that the rotation of said adjustment rod causes the rotation of said socket in the aforesaid direction and is normally prevented in the opposite direction.

5. A device as set forth in claim 3, wherein said means for interlocking said adjustable rod and said socket for rotation in one direction consists of an inner longitudinal rib formed in said socket and of two flat parallel faces formed on either side of said rack of the adjustment rod, the edge of one of said flat faces on the side opposite to that formed with said rack normally abutting against said inner rib so that the rotation of said adjustment rod causes the rotation of said socket in said direction and is limited in the opposite direction.

6. A device as set forth in claim 1, wherein said rack extends along the central portion of the adjustable rod and the end portions of said rod are each journalled in a corresponding slide of said pair of slides on which the seat is secured, said end portions having a smaller cross-section than that of their central portion, shoulders formed between said end portions and said central portion of said adjustment rod and each adapted to be engaged by one of said slides, thereby interlocking said adjustment rod and said seat for axial movement as a unit.

7. A device as set forth in claim 1, wherein said rack of said adjustable rod and said inner teeth in said socket extend angularly over about one-fourth of the circumference of said rod and socket, respectively.

References Cited in the file of this patent

UNITED STATES PATENTS

| | | |
|---|---|---|
| 1,987,431 | Browne | Jan. 8, 1935 |
| 2,974,998 | Himka | Mar. 14, 1961 |